(12) United States Patent
Westberg

(10) Patent No.: US 7,045,165 B2
(45) Date of Patent: May 16, 2006

(54) PROCESS FOR MANUFACTURING ANIMAL FEED SUPPLEMENTS

(75) Inventor: Jeffery A. Westberg, Whitewood, SD (US)

(73) Assignee: Animal Feed Supplement, Inc., Belle Fourche, SD (US)

( * ) Notice: Subject to any disclaimer, the term of this patent is extended or adjusted under 35 U.S.C. 154(b) by 302 days.

(21) Appl. No.: 10/205,857

(22) Filed: Jul. 26, 2002

(65) Prior Publication Data
US 2004/0018288 A1    Jan. 29, 2004

(51) Int. Cl.
*A23K 1/02* (2006.01)

(52) U.S. Cl. ............... 426/635; 426/658; 426/523; 426/392; 426/807

(58) Field of Classification Search .............. 426/72, 426/74, 623, 630, 635, 807, 516, 521, 523, 426/524, 392, 454, 456
See application file for complete search history.

(56) References Cited

U.S. PATENT DOCUMENTS

| | | | |
|---|---|---|---|
| 3,246,336 A | 4/1966 | Baribo et al. | |
| 3,457,086 A * | 7/1969 | Josefowicz et al. | 426/604 |
| 3,895,117 A | 7/1975 | Backlund | |
| 3,961,081 A | 6/1976 | McKenzie | |
| 4,020,189 A | 4/1977 | Wright et al. | |
| 4,047,973 A | 9/1977 | Williams | |
| 4,221,818 A | 9/1980 | Schroeder | |
| 4,275,036 A | 6/1981 | Perry et al. | |
| 4,737,377 A | 4/1988 | Lane et al. | |
| 4,749,578 A | 6/1988 | Benton et al. | |
| 4,851,244 A | 7/1989 | Theuninck et al. | |
| 5,209,157 A * | 5/1993 | Sanchez Rodriguez | 99/455 |
| 5,482,729 A | 1/1996 | McKenzie et al. | |
| 6,143,335 A * | 11/2000 | McKenzie | 426/72 |
| 6,291,008 B1 * | 9/2001 | Robie et al. | 426/620 |
| 6,440,478 B1 | 8/2002 | Benton et al. | |
| 6,726,941 B1 | 4/2004 | Ethington et al. | |

FOREIGN PATENT DOCUMENTS

WO   WO 97/17857   5/2004

OTHER PUBLICATIONS

EPO Search Report and written opinion in re: PCT/US95/14853; Kapplinger, Esther; Jan. 25, 1996.

* cited by examiner

*Primary Examiner*—Milton I. Cano
*Assistant Examiner*—Robert Madsen
(74) *Attorney, Agent, or Firm*—Hovey Williams LLP

(57) ABSTRACT

An improved, continuous process for the production of animal feed supplements including an apparatus for carrying out such process is provided. Broadly, the process includes continuous preparation of a preblend including molasses and vegetable fat, followed by continuous cooking of the preblend in an elongated cooking zone and batch cooking assembly. The cooked preblend is then continuously treated for removal of moisture and partial cooling thereof, whereupon dry ingredients (e.g., vitamins and protein sources) are added and the resultant feed supplement is continuously cooled and packaged.

16 Claims, 1 Drawing Sheet

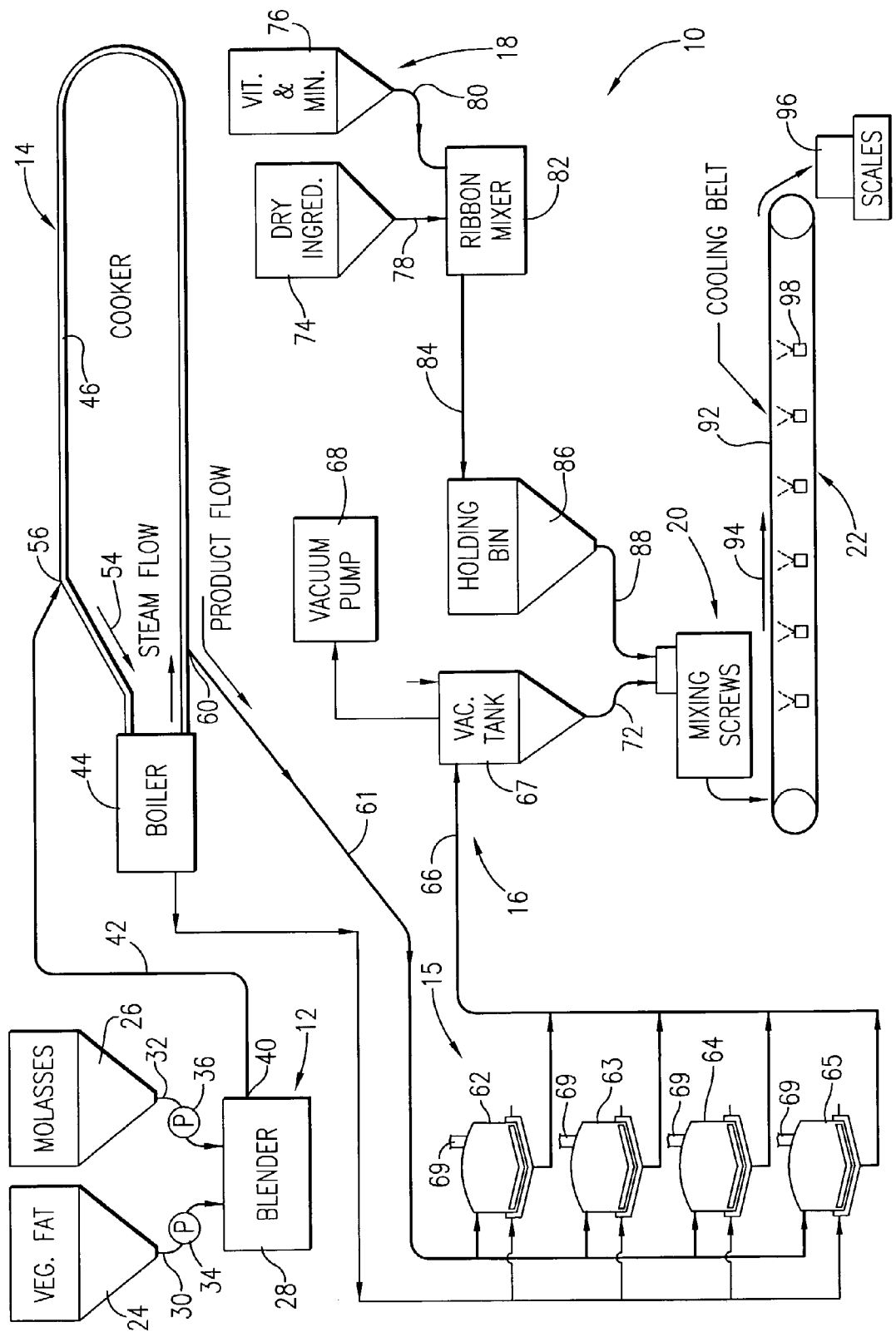

PROCESS FOR MANUFACTURING ANIMAL FEED SUPPLEMENTS

BACKGROUND OF THE INVENTION

1. Field of the Invention

The present invention is broadly concerned with an improved, continuous process and apparatus for the manufacture of animal feed supplements. More particularly, the invention pertains to such an improved process wherein, in preferred forms, a molasses-based preblend is continuously passed through an indirect thermal interchange continuous cooker and a batch-cooking assembly followed by moisture removal and partial cooling; a dry mixture including vitamins and proteinaceous ingredients is then added to the cooked preblend, and the resultant feed supplement is further cooled and packaged.

2. Description of the Prior Art

Animal feed supplements, as used herein, are manufactured nutritional products intended to supplement the basic forage, hay, grain or other diet of livestock such as bison, domesticated cattle, sheep and horses. Molasses-based feed supplements have long been used to enhance the diets of livestock, particularly cattle. Such supplements are commonly in the form of a solid block and are placed in a stockyard for ad libitum consumption by the animals. Molasses-based feed supplements have in the past been produced on a batch basis. For example, U.S. Pat. No. 4,749,578 describes a process for the manufacture of molasses feed blocks wherein molasses and other ingredients are mixed, cooked, cooled and packaged on a batch basis. This manufacturing technique is inherently costly and time-consuming.

U.S. Pat. No. 5,482,729, incorporated by reference herein, describes a continuous process for the manufacture of molasses feed blocks which includes cooking the molasses composition in an elongated, indirect thermal exchange cooker, passing the cooked molasses composition through a cyclone separator and serial vacuum tank for removing moisture from the cooked composition. However, this arrangement presents several problems. The molasses starting materials for use with the '729 process must have relatively low moisture contents (generally less than about 25% by weight) and are generally more expensive than other sugar-rich materials with higher moisture contents. In addition, this process utilizes a single stage cooker to cook the molasses mixture. In order to effectively cook the molasses mixture, the operating temperature within the cooker must be relatively high, approximately 320° F., thereby running the risk of scorching the molasses mixture within the cooker leading to expensive downtime and cooker maintenance.

Accordingly, there is a real and unsatisfied need for an improved continuous process for the manufacture of animal feed supplements which employs lower cooking temperatures and allows for the use of less expensive carbohydrate-rich starting materials with relatively high moisture contents when compared with highly refined molasses.

SUMMARY OF THE INVENTION

The present invention overcomes the problems noted above, and provides a continuous process and apparatus for the manufacture of animal feed supplements, and particularly molasses-based supplements.

Broadly speaking, the process of the invention involves first continuously preparing a preblend including respective amounts of carbohydrate material and fat. The carbohydrate material may comprise any sugar-based material palatable to animals and can further include significant amounts of moisture and protein. Advantageously, carbohydrate material for use with the invention may comprise up to about 50% by weight water, preferably up to about 40% by weight water, and more preferably between about 20–30% by weight water. Preferably the carbohydrate material is chosen from the group consisting of molasses, including cane and beet molasses, concentrated separator by-product (CSB), corn steep liquor, soybean whey and mixtures thereof. As used herein, concentrated separator by-product refers to a high-protein, high-moisture product produced during processing of beet molasses. While most preferably the carbohydrate material will comprise molasses, as molasses costs increase, significant amounts of corn steep liquor, a by-product of dextrose processing, CSB, and soybean whey may be used in lieu of some or all of the molasses. In preferred embodiments, the carbohydrate material will comprise between up to 100% soybean whey (more preferably between 10%–60%, most preferably 10%–40%) and 10–60% corn steep liquor (more preferably between 10–30% corn steep liquor). In yet other preferred embodiments, the carbohydrate material may comprise 100% CSB. Preferably, the fat used in preparing the preblend is a vegetable fat, such as corn or soy oil. The preblend typically contains from about 60–80% by weight carbohydrate material and from about 5–10% by weight of fat. Preferably, the preblend contains from about 65–75% by weight carbohydrate material, from about 3–7% by weight fat, and from about 4–20% protein.

In the next step, the preblend is continuously passed into and through an elongated cooking zone where the preblend is heated and at least partially cooked. Such partial cooking is preferably accomplished via indirect, countercurrent thermal heating; in practice, the cooking zone comprises a conduit through which the preblend is directed; the conduit being contacted with a heated cooking fluid. More preferably the cooking zone includes an annular preblend-conveying zone with inner and outer heating fluid-conveying zones respectively disposed adjacent the inner and outer margins of the annular zone. Steam or other thermal interchange media, such as hot oil, is continuously passed in countercurrent relationship to the preblend passing through the annular zone of the cooker. In any case, the preblend passing through the elongated cooking zone should be heated to a temperature of between about 240°–320° F., more preferably between about 260°–300° F., and most preferably between about 260°–270° F. In order to achieve these temperature conditions using the preferred cooker, the preblend would normally be present in the cooking system for a period of from about 1–5 minutes and preferably between about 2–3 minutes.

The partially-cooked preblend, is directed into a continuous batch-cooking assembly, operating under atmospheric pressure, for completion of cooking, thereby flashing moisture from and lowering the temperature of the preblend. The batch-cooking assembly comprises a plurality of batch cookers arranged in parallel. Preferably the assembly will comprise at least three such cookers and is located downstream from the elongated cooking zone. At any given time, at least one cooker is filling with preblend from the elongated cooking zone and at least one cooker is emptying thereby providing a continuous output stream of cooked preblend. Preferably, the batch cookers employ indirect thermal interchange to heat the preblend to a temperature of between about 255°–290° F., more preferably between 260°–280° F., and most preferably between about 262°–268° F. Steam is the preferred heat transfer media in this regard. In order to accomplish heating the preblend to the preferred temperatures, the residence time of the preblend within the batch cooker is preferably about 10–60 minutes and more preferably about 15–25 minutes.

At the conclusion of the cooking step, the cooked material is continuously passed into and through a moisture-removal zone, preferably in the form of a vacuumizer tank operably connected to a vacuum pump. This serves to remove moisture from the cooked preblend, and also lowers the temperature thereof. Normally, the moisture content of the cooked preblend is lowered to a level of from about 1.5–10% by weight (more preferably from about 2–5% by weight), whereas the temperature of the cooked preblend is lowered to a level of from about 150°–220° F. (more preferably from about 200°–210° F.).

In the next step, dry components are added to the preblend to form a substantially homogenous and flowable feed supplement. Such dry components include the usual vitamins and proteinaceous ingredients, and use can be made of plant and/or animal protein sources. The feed supplement is then continuously cooled and packaged into quantities of desired size. This cooling step will comprise either allowing the material to cool under ambient conditions or by continuously passing the supplement onto an endless, moving belt with a packaging station at the end of the belt. In order to enhance cooling, water is sprayed against the underside of the belt.

The improved process of the present invention is approximately 20% faster or alternatively produces approximately 20% more product in the same amount of time as compared to the process disclosed in U.S. Pat. No. 5,482,729. The increased production occurs without extra labor and results in valuable energy savings.

BRIEF DESCRIPTION OF THE DRAWING

The FIGURE is a schematic flow diagram illustrating the preferred apparatus and method steps used for the continuous production of animal feed supplements in accordance with the invention.

DETAILED DESCRIPTION OF THE PREFERRED EMBODIMENT

Turning now to the FIGURE, apparatus 10 for the continuous manufacture of animal feed supplements is illustrated. Broadly, the apparatus 10 includes a preblending assembly 12, an elongated cooker 14, a batch cooking assembly 15, a moisture removal station 16, a dry mix preparation assembly 18, a blender 20 and a cooling/packaging assembly 22.

In more detail, the assembly 12 includes individual, stirred tanks 24 and 26 for holding supplies of vegetable fat (e.g. corn or soy oil) and molasses. The tanks 24, 26 are connected to a liquid blender 28 via lines 30, 32, the latter having variable speed pumps 34, 36 interposed therein. The outlet 40 of blender 28 is coupled with a transfer conduit 42 leading to cooker 14.

The cooker 14 is in the form of a continuous, open loop, indirect thermal interchange device. In detail, the cooker 14 includes a steam boiler 44 and a continuous conduit system 46 operably coupled with boiler 44. In preferred embodiments, the conduit system 46 includes an innermost, central, steam-conveying pipe, an annular preblend-conveying imperforate conduit disposed about the central pipe, and an outermost, annular, steam-conveying pipe disposed about the annular conduit (latter components not shown). As shown in the FIGURE, conduit system 46 is connected to boiler 44 for flow of steam through the steam-conveying pipes of conduit system 46 in the direction indicated by arrows 54. However, the preblend from assembly 12 passes through transfer conduit 42 to an inlet 56 in communication with the annular conduit. Thus, the preblend from blender 28 passes through conduit 42 and thence through conduit system 46 in countercurrent relationship with the flow of steam through conduit 46. While in cooker 14, the preblend is heated and undergoes at least partial cooking. Again referring to the FIGURE, a preblend outlet 60 is provided, the latter being coupled to transfer conduit 61. The outlet 60 is in communication with the preblend conveying conduit of conduit system 46, thereby allowing cooked preblend to pass from cooker 14 to assembly 15.

Assembly 15 includes four batch cookers 62–65 arranged in parallel and operating under atmospheric pressure. The batch cookers 62–65 are supplied with steam from boiler 44. During operation of assembly 15, the entire stream of preblend conveyed in conduit 61 is directed into a single batch cooker, 62 for example, whereby a portion of the preblend moisture flashes off and the temperature of the preblend is lowered. Once cooker 62 has reached its operational capacity, the entire stream of preblend in conduit 61 is directed into another batch cooker 63, for example. While cooker 63 is filling, the preblend contained within cooker 62 is heated and cooked. Once cooker 63 has reached capacity, the stream of preblend in conduit 61 is directed into cooker 64. While cooker 64 is filling, the material within cooker 63 is heated and cooked, and cooker 62 empties the cooked preblend into transfer conduit 66. The cycle of alternating cookers filling, cooking, and emptying is such to supply conduit 66 with a continuous stream of cooked preblend. Cooker 65 is generally not employed during normal operation of assembly 15, but rather acts as a backup cooker to handle any surge in apparatus 10 production or should one of cookers 62, 63, 64 be taken offline for maintenance. The batch cookers 62–65 are equipped with vents 69 which are open to the atmosphere to allow for removal of moisture from the preblend during cooking thereof.

The moisture removal station 16 includes a vacuumizer tank 67 and vacuum pump 68. As will be apparent to those skilled in the art, cooked preblend passes from conduit 66 into and through vacuum tank 67 for removal of moisture and cooling of the preblend. The underflow from tank 67 travels by way of pipe 72 to blender 20.

The assembly 18 includes individual holding tanks 74 and 76 for the dry ingredients and vitamins and minerals desired for incorporation into the feed supplement. The tanks 74, 76 are connected by conduits 78, 80 and appropriate augers (not shown) with a ribbon mixer 82. The output from mixer 82 is conveyed through conduit 84 and a transfer auger (not shown) to a holding bin 86; the latter has a pipe 88 leading to blender 20 as shown.

The blender 20 includes variable speed controls. The outlets of pipes 72 and 88 are in communication with the mixing screws of the blender. The outlet from the mixing screws is in the form of a completed feed supplement which is substantially homogeneous and flowable. This flowable mixture passes from the mixing screws and is deposited onto an endless, moving stainless steel belt 92. The belt moves in the direction illustrated by arrow 94, and thereby serves to continuously deposit cooled feed supplement into drums 96 or other appropriate containers at the end of the belt remote from the mixing screws. Preferably, water is sprayed via heads 98 against the underside of the belt 92, thereby maximizing the cooling effect during passage of the feed supplement along the belt.

In practice, the molasses and vegetable oil in tanks 24, 26 are metered into blender 28 at the preferred ratios noted above. Since molasses varies in moisture content from area to area and refinery to refinery, direct weighing of uncooked molasses is not always determinative of specific operating conditions to be used at various steps throughout the process. Operating conditions, such as cooker temperatures and residence times, may need to be adjusted based upon the moisture content of the molasses fed to the process. The output from blender 28 passes through the cooker 14 which in practice is about 120 feet long. In cooker 14, the preblend is heated to a temperature of between about 260°–300° F. The preblend has a residence time within cooker 14 of about 1–5 minutes. Upon exiting the cooker 14, the preblend is directed to one of the batch cookers 62, for example, for additional cooking. The particular batch cooker 62–65 to which the incoming stream of preblend is directed is automatically controlled so that at least one batch cooker 62–65 is filling at any given time. In assembly 15, the preblend undergoes further cooking at a temperature of between about 260°–280° F. The preblend remains in the batch cooker 62 for about 10–60 minutes. Preferably, three batch cookers 62–64 will be in operation at any given time. One cooker 62 will be receiving preblend from cooker 14, one cooker 63 will be cooking the preblend, and one cooker 64 will be emptying cooked preblend so that a continuous stream of preblend may be supplied to moisture removal station 16. A fourth batch cooker 65 may be employed to handle overflow from cooker 14 resulting from preblend flow rate changes. Following cooking, the preblend passes into vacuum tank 67, the latter having a vacuum of about 21–24 inches of mercury. This causes the product to release steam and moisture, to a level of about 2% to 4% by weight, along with a lowering of the temperature of the product to between about 200°–220° F.

The dry ingredients from tanks 74 and 76 are conveyed by the augers to ribbon mixer 82, the latter resting on an electronic scale. The mixture is held in blender 82 then conveyed to holding bin 86.

The cooked preblend in tank 67 is pumped and the dry ingredients in bin 86 are augered to the mixing screw section 20 with both regulated by variable speed controls. The latter is operated to produce a substantially homogeneous and flowable product at a temperature between about 150°–200° F. The product is then conveyed on belt 92 for cooling and packaging. During packaging, the product has a temperature of about 140° F. and is in a taffy-like state. Once packaged, the product is set aside for complete cooling to ambient temperature, where it becomes hardened like rock candy.

EXAMPLE

A 6400 lb/hr stream of beet molasses having a moisture content of 23% by weight was blended with a 340 lb/hr stream of hydrolyzed soy oil to produce a liquid mixture having a moisture content of 23% by weight. All moisture contents expressed herein are based upon the weight of the entire mixed wet stream being 100%. The mixture was fed at a temperature of 100° F. (ambient temperature) to an indirect heat interchange continuous pipe cooker having a length of 120 feet and an internal cooking chamber having a diameter of 1½ inches. While inside the continuous cooker, the liquid mixture was heated to a temperature of 270° F. at a pressure of 40 psi over a period of 2 minutes during which the mixture was partially cooked. Upon exiting the continuous cooker at 270° F., the liquid mixture was fed into one of four batch cookers arranged in parallel operating under atmospheric pressure and ambient temperature. Upon entering the batch cooker, a portion of the liquid mixture's moisture flashed off and the mixture temperature was lowered to 245° F. The moisture content of the liquid mixture after flashing was 8% by weight. The mixture was then cooked inside the batch cooker for 25 minutes to a temperature of 265° F. The cooked liquid was discharged into a vacuum tank operating at a vacuum of 24 inches of mercury and the temperature of the liquid mixture was lowered to 212° F. Upon exiting the vacuum tank, the liquid mixture had a moisture content of 2% by weight. The liquid mixture was blended with a 2600 lb/hr stream of dry ingredients comprising 38% by weight of assorted minerals and vitamins and 62% by weight of meal proteins, the dry ingredient stream having a moisture content of less than 5% by weight. The blended product had a temperature of 170° F. The final product had a moisture content of 4% by weight immediately prior to packaging in open topped containers and exhibited taffy-like consistency. After cooling, the product was hard and crystallized.

The inventor hereby states his intent to rely on the Doctrine of Equivalents to determine and assess the reasonably fair scope of his invention as pertains to any apparatus not materially departing from but outside the literal scope of the invention as set out in the following claims.

I claim:

1. A continuous process for the manufacture of an animal feed supplement comprising the steps of:
   continuously preparing a preblend including respective amounts of carbohydrate material, moisture, and fat;
   continuously directing said preblend into and through an elongated cooking zone for at least partial cooking thereof at above atmospheric pressure and at a first temperature, followed by;
   continuously passing said preblend into a batch-cooking assembly comprising a plurality of batch cookers operating at a pressure below said above atmospheric pressure and arranged in parallel for cooking said preblend and flashing a portion of said preblend moisture upon passage of said preblend into said batch-cooking assembly thereby lowering the temperature of said preblend, said preblend being cooked in said batch-cooking assembly at a second temperature lower than said first temperature,
   said step of passing said preblend into said batch-cooking assembly comprising continuously filling at least one of said plurality of batch cookers with preblend while continuously emptying cooked preblend from at least one other of said plurality of batch cookers;
   continuously passing said cooked preblend into and through a moisture removal zone wherein part of the moisture of the preblend is removed;
   continuously adding dry components to said preblend and forming a substantially homogeneous and flowable feed supplement; and
   continuously cooling and packaging said feed supplement into quantities of desired size.

2. The process of claim 1, said batch cooking assembly located downstream from said elongated cooking zone.

3. The process of claim 1, at least one of said batch cookers emptying at any given time thereby continuously supplying a stream of preblend to said moisture removal zone.

4. The process of claim 1, heating said preblend in said elongated cooking zone to a temperature of from about 240°–320° F.

5. The process of claim 1, heating said preblend in said elongated cooking zone for a period of from about 1–5 minutes.

6. The process of claim 1, heating said preblend in said batch cooking assembly to a temperature of between about 255°–290° F.

7. The process of claim 1, heating said preblend in said batch cooking assembly for a period of from about 10–60 minutes.

8. The process of claim 1, said moisture removal step comprising continuously passing said preblend through a vacuum tank operably coupled with a vacuum pump.

9. The process of claim 8, including the step of operating said vacuum tank and pump for reducing the moisture content of the preblend to a level of from about 1.5–10% by weight, and for lowering the temperature of the preblend to a temperature of from about 150°–220° F.

10. The process of claim 1, said dry components including vitamins and plant and animal protein sources.

11. The process of claim 1, said carbohydrate material being selected from the group consisting of molasses, concentrated separator by product, corn steep liquor, and mixtures thereof.

12. The process of claim 1, said fat comprising vegetable fat.

13. The process of claim 1, said preblend comprising from about 60–80% by weight carbohydrate material and from about 5–10% by weight fat.

14. The process of claim 1, including the step of continuously passing said feed supplement onto an endless, moving belt for cooling of the feed supplement, and thereafter transferring the cooled supplement into containers.

15. The process of claim 14, including the step of spraying water against the underside of said belt for cooling of said feed supplement thereon.

16. A continuous process for the manufacture of an animal feed supplement comprising the steps of:

continuously preparing a preblend including respective amounts of carbohydrate material, moisture, and vegetable fat;

continuously directing said preblend into and through an elongated cooking zone operating at above atmospheric pressure and at a first temperature, said cooking zone defined by a conduit through which said preblend is directed, said conduit being contacted with a heated cooking fluid for transferring heat from the fluid to the preblend for heating said preblend to a first temperature for at least partial cooking thereof, followed by;

continuously passing said preblend into a batch cooking assembly comprising a plurality of parallel batch cookers operating at a pressure below said above atmospheric pressure for cooking said preblend, said preblend being cooked in said batch-cooking assembly at a second temperature lower than said first temperature, at least one of said batch cookers emptying at any given time while at least one other of said batch cookers is filling for supplying a continuous stream of preblend from said cooking assembly, said cooking assembly located downstream from said elongated cooking zone;

flashing a portion of said preblend moisture upon passage of said preblend into said batch-cooking assembly thereby lowering the temperature of said preblend;

continuously passing said cooked preblend into and through a moisture-removal zone located downstream from said batch cooking assembly wherein part of the moisture of the preblend is removed;

continuously adding dry components including proteinaceous ingredients to said preblend and forming a substantially homogeneous and flowable feed supplement; and continuously cooling and packaging said feed supplement into quantities of desired size.

* * * * *